(12) United States Patent
Delia et al.

(10) Patent No.: US 8,397,536 B2
(45) Date of Patent: Mar. 19, 2013

(54) APPARATUS AND METHOD FOR CONTROLLING THICKNESS OF A FLOWING RIBBON OF MOLTEN GLASS

(75) Inventors: Robert Delia, Horseheads, NY (US); Keith R. Gaylo, Painted Post, NY (US); Vladislav Y. Golyatin, Avon (FR); Bulent Kocatulum, Horseheads, NY (US); Barry P. LaLomia, Corning, NY (US); William A. Whedon, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/112,447

(22) Filed: May 20, 2011

(65) Prior Publication Data

US 2011/0289969 A1 Dec. 1, 2011

Related U.S. Application Data

(60) Provisional application No. 61/348,516, filed on May 26, 2010.

(51) Int. Cl.
*C03B 17/06* (2006.01)
(52) U.S. Cl. ............ 65/84; 65/90; 65/195; 65/204
(58) Field of Classification Search ............ 65/84, 90, 65/195, 204
See application file for complete search history.

(56) References Cited

U.S. PATENT DOCUMENTS

| | | | | |
|---|---|---|---|---|
| 3,438,518 | A * | 4/1969 | Aerts | 414/148 |
| 3,682,609 | A * | 8/1972 | Dockerty | 65/83 |
| 3,723,082 | A * | 3/1973 | Knowles et al. | 65/84 |
| 6,990,834 | B2 | 1/2006 | Pitbladdo | 65/29.21 |
| 6,997,017 | B2 | 2/2006 | Pitbladdo | 65/53 |
| 7,155,935 | B2 | 1/2007 | Pitbladdo | 65/53 |
| 7,681,414 | B2 | 3/2010 | Pitbladdo | 65/193 |
| 8,006,517 | B2 | 8/2011 | Pitbladdo | 65/99.1 |
| 8,042,361 | B2 | 10/2011 | Pitbladdo | 65/195 |
| 8,056,365 | B2 | 11/2011 | Pitbladdo | 65/90 |
| 2003/0029199 | A1* | 2/2003 | Pitbladdo | 65/195 |
| 2011/0126591 | A1* | 6/2011 | Chalk et al. | 65/84 |

* cited by examiner

*Primary Examiner* — Matthew Daniels
*Assistant Examiner* — Cynthia Szewczyk
(74) *Attorney, Agent, or Firm* — Kevin M. Able (57) ABSTRACT

In the formation of sheet material from molten glass, a cooling tube is positioned in the forming area for directing a flow of cooling gas on discrete portions of the molten glass proximate a draw line or root to control local thickness variations in the sheet and thereby provide a uniform glass sheet thickness across the width of the sheet. The cooling tube is disposed in a pivot member configured to rotate about at least one axis, thereby causing an end of the cooling tube to direct the cooling gas over a wide range of angular positions across a portion of the width of the molten glass flowing over and from a forming body.

19 Claims, 9 Drawing Sheets

APPARATUS AND METHOD FOR CONTROLLING THICKNESS OF A FLOWING RIBBON OF MOLTEN GLASS

CLAIMING BENEFIT OF PRIOR FILED U.S. APPLICATION

This application claims the benefit of priority under 35 U.S.C. §119 to U.S. Provisional Application Ser. No. 61/348,516, filed on May 26, 2010, the content of which is relied upon and incorporated herein by reference in its entirety.

FIELD

This invention relates to a method and apparatus for controlling the thickness of a flow of molten glass, and more particularly to controlling the thickness of a continuous flow of molten glass in a downdraw glass sheet forming process.

BACKGROUND

When molten glass is drawn into sheet form, the glass is stretched or attenuated from an initial delivered thickness to a final sheet thickness. In the overflow downdraw process, where molten glass flows downwardly along opposed converging sides of a forming member and is withdrawn as a single ribbon of glass from the root or bottom edge thereof, the initial thickness of the glass ribbon is measured close to the bottom edge of the forming member, which represents the draw line in such an operation. Single sheets of glass are then separated from the free end of the drawn ribbon.

Obtaining thickness uniformity of the ribbon has been a problem in both updraw and downdraw processes where the thickness characteristics of the final sheet are determined during the attenuation process by both the uniformity of initial thickness and by the uniformity of the glass viscosity. That is, a given thickness variation in the final sheet may be the result of inaccurate metering, imperfections in the glass-contacting sides of the forming member, or by imbalances in the temperature environment of the glass that cause imperfections in the viscosity profile of the glass flowing toward the draw line.

Thickness variation in sheet glass is a problem that has been considered by the industry to be inherent in sheet drawing processes, and may manifest itself in several general types of defects, such as wedge, long period wave variations, and short period wave variations. Wedge is a gross thickness variation in which the ribbon or sheet is thicker at one edge than the other. Long wave variations are those that have considerable amplitude and extent, such as in excess of several inches, and can be measured by gauging the ribbon along a path in a direction transverse to the direction of the draw. Short wave variations are of small amplitude and pitch, such as about three inches or less, and are generally superimposed on the long wave variations.

It has been found that to make distortion-free sheet glass, it is necessary to minimize or compensate for local temperature variations or fluctuations within and around the glass in the zone of ribbon formation. Such local variations in temperature in the vicinity of the draw line cause waves, or alternate thick and thin portions running longitudinally in the vertically drawn ribbon. The longitudinal waves or thickness variations, in turn, cause distortion that is highly objectionable from an optical standpoint, particularly when objects are viewed through the glass at a sharp angle to the waves.

Prior art methods of controlling these thickness variations included flowing air against the molten glass from cooling tubes arrayed along the length of the forming body. The straight cooling tubes were arranged at equal intervals along the forming body length, and positioned so the central longitudinal axis of each tube was perpendicular to a vertical plane passing through the root. Moreover, the cooling tubes were shrouded by an outer tubular shield. Thus, the tubes were rigidly positioned in relationship to the forming body and the glass flow.

Unfortunately, thickness defects in the glass ribbon may not be positionally stable over long periods of time, nor may the lateral position of the ribbon itself be constant. Thus, the pre-positioned and immovable cooling tubes may at a first instance be properly positioned, but at a second time be ill-positioned to effectively control thickness due to movement of the defect or ribbon.

The present invention is directed to an improved method of cooling the flowing molten glass to eliminate, or substantial reduce, the general type of thickness variation identified as short wave variation having a width of several inches or less, and an apparatus therefor.

SUMMARY

In accordance with one embodiment, an apparatus for forming a continuous ribbon of molten glass in a downdraw glass making process comprising a forming body including converging forming surfaces that converge at a root, an enclosure disposed about the forming body, and a cooling apparatus coupled to the enclosure comprising a fixture, a pivot member disposed within the fixture, the pivot member configured to rotate about at least one axis passing through the pivot member, and a cooling tube, preferably formed from a refractory material, configured to direct a cooling gas flow toward molten glass flowing over the forming body coupled to the pivot member, wherein rotation of the pivot member about the at least one axis causes a distal end of the cooling tube to vary a lateral position relative to the forming body. The pivot member may be substantially spherical, and in some embodiments may be cylindrical. The at least one axis may be a vertical axis.

According to some embodiments, the fixture comprises a mating surface complementary to a mating surface of the pivot member, and the housing is configured to receive the pivot member and thereby prevent gas flow between the pivot member and the socket by forming a close tolerance fit between the mating surfaces.

The cooling tube comprises a proximal end farthest from the flow of molten glass and a distal end extending into close proximity of the flowing molten glass. The cooling tube may be straight along its entire length, or the cooling tube may include a bend or kink proximate the distal end, thus allowing rotation of the cooling tube about a longitudinal axis of the cooling tube to direct cooling gas flow about a circular arc.

Preferably, the apparatus comprises a plurality of cooling tubes arrayed adjacent at least a portion of a length of the forming body, and preferably along each side of the forming body. The cooling tubes may be configured along a horizontal line, or vertically staggered as needed to control thickness variation. For example, a first cooling tube may be positioned at one vertical position relative to the root of the forming body, whereas a second cooling tube may be positioned at a second vertical location different from the vertical location of the first cooling tube.

In another embodiment, a method of controlling a thickness of a continuous ribbon of molten glass in a fusion downdraw process is disclosed comprising flowing molten glass over converging forming surfaces of a forming body, the converging forming surfaces meeting at a root, directing a cooling gas flow to impinge against the molten glass proximate the root from at least one cooling tube coupled to a pivot member configured to rotate about at least one axis of rotation, and wherein at least a portion of a central longitudinal axis of the at least one cooling tube is not perpendicular to a vertical plane passing through the root.

As in the preceding embodiment, the cooling tube comprises a proximal and a distal end where the distal end is closer to the flow of molten glass than the proximal end. The cooling tube may be straight, or the cooling tube may include a bend or kink proximate the distal end, thus allowing rotation of the cooling tube about a longitudinal axis of the cooling tube to direct cooling gas flow about a circular arc. Cooling gas may be directed through a single tube or may be directed at the flowing molten glass through a plurality of cooling tubes. Preferably, the cooling tubes are arrayed horizontally along a length of both longitudinal sides of the forming body. However, the cooling tubes can be vertically staggered as described above. The cooling gas flow may impinges on the molten glass above the forming body root or in other embodiments be directed at locations below the forming body root (e.g. directed downstream relative to the direction of flow of the molten glass.

In some embodiments a portion of the longitudinal axis of the at least one cooling tube is perpendicular to a vertical plane within which the root lies. Thus, a straight tube may be used that has a central longitudinal axis, and the longitudinal axis of this straight cooling tube is perpendicular to a vertical plane passing through the root of the forming body. Alternatively, the cooling tube may include a bend proximate the distal end, and a central longitudinal axis of the straight portion between the bend and the proximal end is perpendicular to a vertical plane passing through the root of the forming body.

The method may further comprise rotating the pivot member about the axis of rotation so that the cooling tube demonstrates at least side-to-side motion (yaw). The pivot member may be configured to rotate about at least two orthogonal axis of rotation, such as side-to-side yaw and up-down pitch.

In still another embodiment, a method of controlling a thickness of a continuous ribbon of molten glass in a fusion downdraw process is described comprising flowing molten glass over converging forming surfaces of a forming body, the converging forming surfaces meeting at a root, directing a cooling gas flow against the molten glass proximate the root from at least one cooling tube coupled to a pivot member configured to rotate about a plurality of axes of rotation, and wherein at least a portion of a central longitudinal axis of the at least one cooling tube is not perpendicular to a vertical plane passing through the root. The plurality of axes may comprise a vertical axis and a horizontal axis.

In some embodiments, the cooling gas flow may be directed below the root (e.g. having a direction component in the same direction as the direction of flow of the molten glass.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification. It is to be understood that the various features of the invention disclosed in this specification and in the drawings can be used in any and all combinations.

DETAILED DESCRIPTION

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

Figure 1:
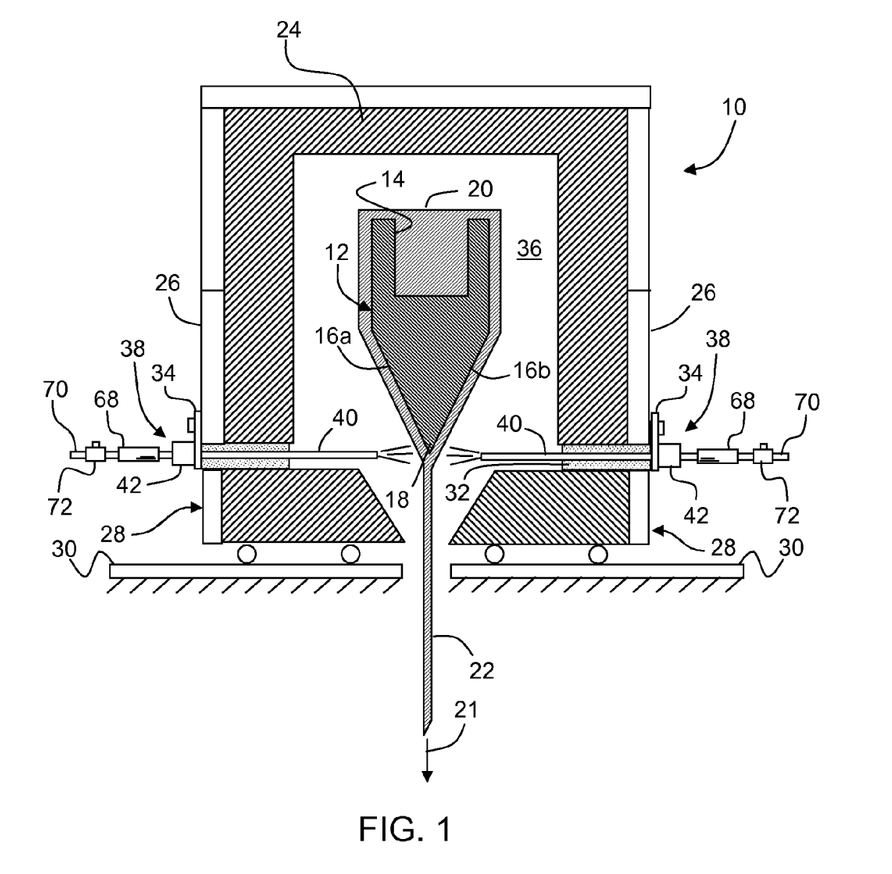
FIG. 1 is cross sectional view of an exemplary fusion downdraw glass making apparatus utilizing a cooling unit according to an embodiment of the present invention.

Shown in FIG. 1 is an apparatus 10 for drawing a glass ribbon according to an exemplary fusion downdraw process. Apparatus 10 comprises forming body 12 having an upper channel or trough 14 disposed therein. Forming body 12 includes converging forming surfaces 16a, 16b that converge at a lower edge or draw line 18 from where the molten glass is drawn from the forming body. Lower edge 18 may also be referred to as root 18. Molten glass 20 is supplied to trough 14, and overflows the trough such that the molten glass flows over upper edges of the trough and down converging forming surfaces 16a, 16b as two separate flows of molten glass. These separate flows of molten glass reunite, or fuse, at the forming body root, and continue downward in direction 21 from the root as a single glass ribbon 22. Hence, the process is sometimes referred to as the fusion process, or the fusion downdraw process. Those portions of the molten glass contacting the forming surfaces of forming body 12 are positioned within the interior of the ribbon drawn from the root 18, leaving the outer surfaces of the ribbon in a pristine condition.

To control the thermal environment surrounding the forming glass, forming body 12 is positioned within a refractory enclosure or muffle 24 having structural support members 26. Muffle doors 28 are positioned below muffle 24 along opposite sides of glass ribbon 22, and can be moved inwardly or outwardly along support rails 30. To prevent air leakage or drafts, the space between muffle 24 and muffle doors 28 may be filled with a suitable refractory insulating material 32, such as mineral wool fibers. Outer shield members 34 are affixed to muffle 24 and extend downward, skirt-like, to the top of the muffle doors 28. Outer shield members 34 may be formed from a metal such as stainless steel. Outer shield members 34 serve to further eliminate potential drafts resulting from an exchange of air between the atmosphere within the muffle and the atmosphere outside the muffle. However, because each muffle door is configured to move inward or outward relative to the glass ribbon, the outer shield members 34 are not permanently attached to muffle doors 28.

Figure 2:
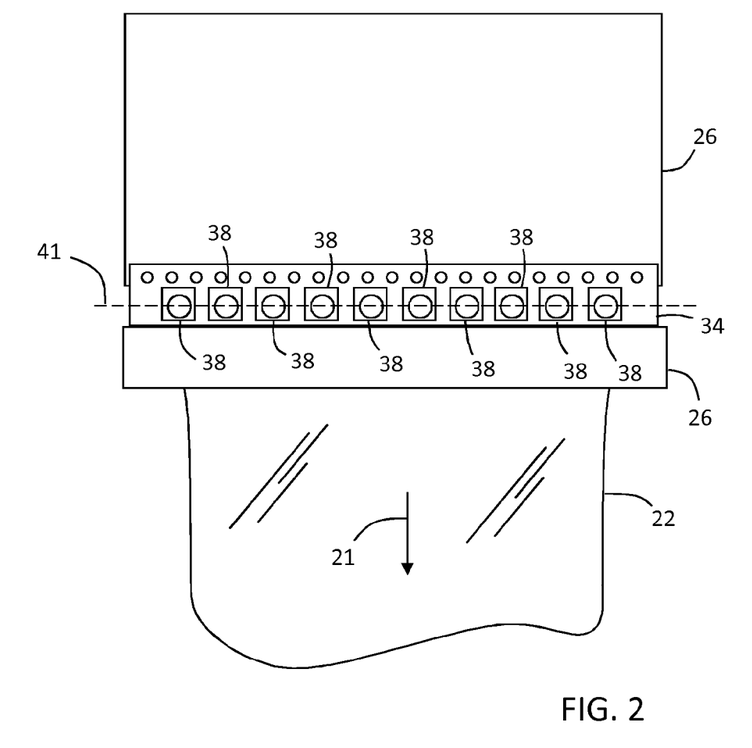
FIG. 2 is a side view of the apparatus of FIG. 1 showing a substantially horizontal array of a plurality of cooling units.
Figure 3:
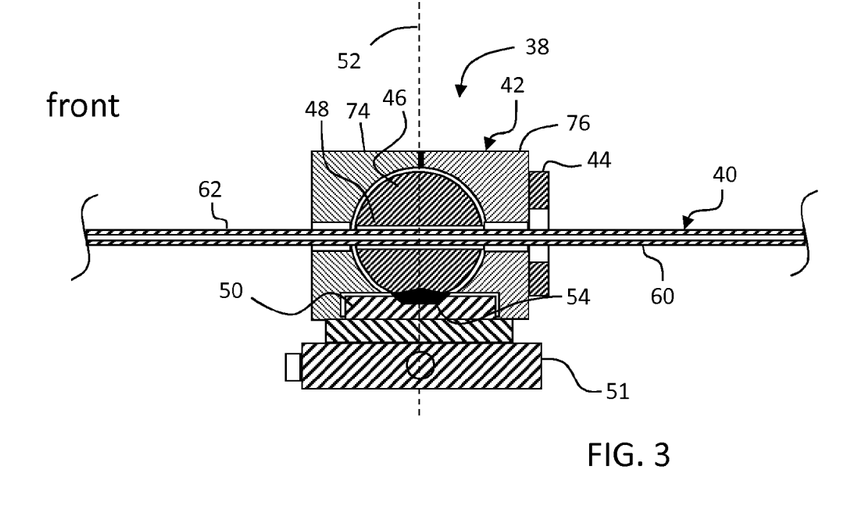
FIG. 3 is a cross sectional view of an exemplary cooling unit according to an embodiment of the present invention.
Figure 4:
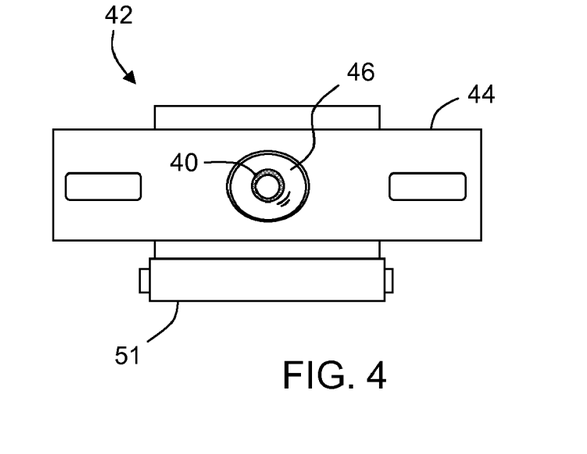
FIG. 4 is a front view of the cooling unit of FIG. 3 showing the mounting bracket.

A plurality of cooling units 38 are preferably positioned between muffle 24 and muffle doors 28, and may, for example, be mounted on outer shield members 34. Each cooling unit 38 includes a cooling tube 40 spaced apart from adjacent cooling tubes of adjacent cooling units, preferably in a substantially horizontal plane 41 (see FIG. 2). Each cooling unit further comprises a fixture 42 (FIGS. 3 and 4) that encloses a portion of each cooling tube. Bracket 44 of fixture 42 can be used to couple each cooling unit to outer shield member 34, and maintains the cooling tubes in a spaced apart relationship on outer shield member 34. Each cooling tube extends into interior volume 36 enclosed by muffle 24. Each cooling tube 40 terminates in close proximity of forming body 12, and in particular in close proximity to root 18.

Each cooling tube 40 is formed from a material capable of resisting deformation at the high temperature within muffle 24, e.g. in excess of 1000° C., and in some cases greater than about 1250° C. For example, a cooling tube can be formed from a metal resistant to high temperature, such as certain high temperature alloys available from Haynes International Corporation, including such materials as Haynes® alloy 214 or 230. In other embodiments, each cooling tube may be formed from a refractory material, such as alumina, quartz or certain high melting temperature glasses. Here, refractory materials are defined as non-metallic materials having those chemical and physical properties that make them applicable for structures, or as components of systems, that are exposed to environments above about 538° C.

Each cooling tube 40 is coupled to a pivot member 46, wherein each pivot member includes a passage 48 through which a cooling tube extends. The cooling tube may be rigidly bonded within pivot member passage 46, such as with high temperature cement, or the cooling tube may be held by other methods, such as a compression fitting or clamping. In the case that the cooling tube is formed of a brittle material such as alumina or quartz, cementing is preferred, since various clamping methods may result in crushing of the tube.

Figure 5:
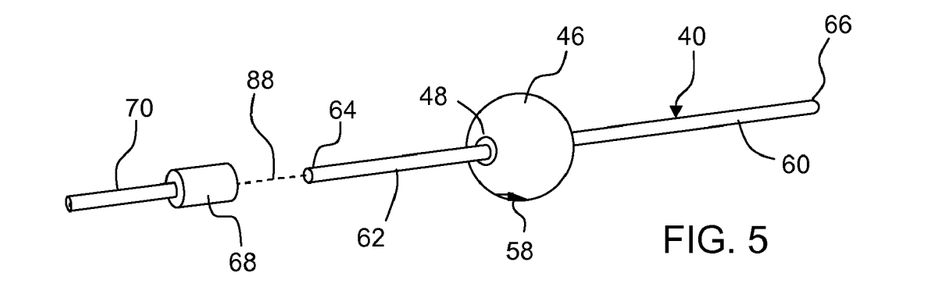
FIG. 5 depicts an exemplary a pivot member-cooling tube unit comprising a straight cooling tube.
Figure 6:
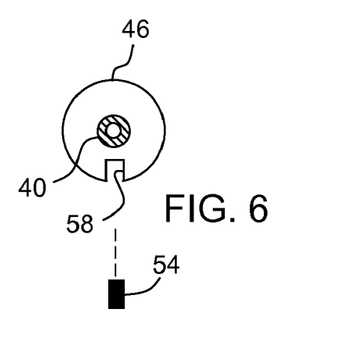
FIG. 6 is a view of the pivot member of FIG. 5 showing the keyway and a key that is received by the keyway.
Figure 7:
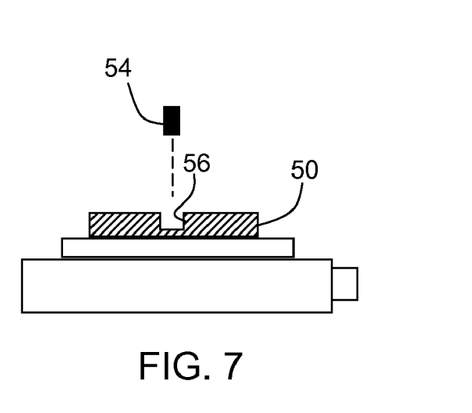
FIG. 7 is a side view of a rotary platform comprising the cooling unit of FIG. 3, and illustrating the keyway and a key for coupling a pivot member
Figures 8, 9, 10:
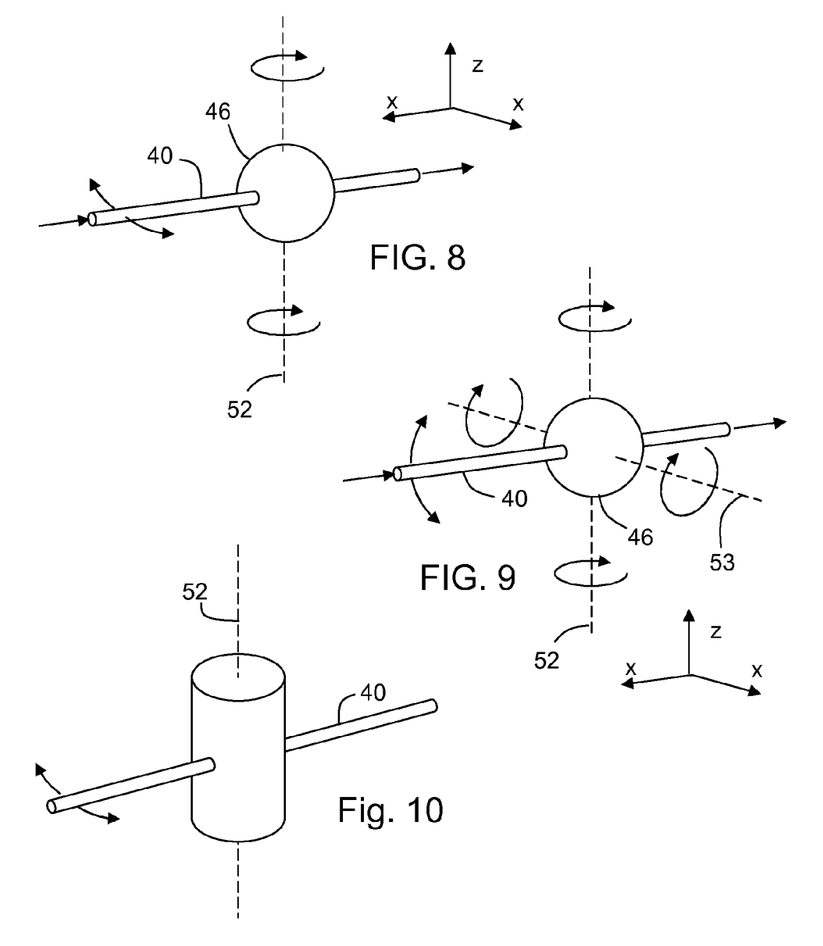
FIG. 8 depicts an exemplary a pivot member having a single degree of movement freedom about a vertical axis, allowing the pivot member to demonstrate yaw, or a side to side swing.
FIG. 9 depicts an exemplary a pivot member having a single degree of movement freedom about a horizontal axis, allowing the pivot member to demonstrate pitch, or an up and down movement.
FIG. 10 depicts an exemplary cylindrical pivot member demonstrating yaw.

As best shown in FIGS. 5 and 6, each pivot member 46 may be substantially spherical in shape, and may, for example, be a steel sphere defining the aforementioned passage 48. By substantially spherical what is meant is that a major portion of the outside surface of the pivot member is spherical, or at least those portions that contact the mating surfaces of socket members described more fully herein below. Pivot member 46 is coupled to a platform 50 comprising, for example, a precision rotary stage 51, wherein the rotary stage 51 allows precise movement of the pivot member about axis of rotation 52 of the platform. Pivot member 46 may be keyed to platform 50 to prevent relative rotational movement between the pivot member and the platform about vertical axis of rotation 52. Consequently, key 54 may be positioned between pivot member 46 and platform 50 via corresponding slots or keyways 56, 58, respectively, in each of the platform and pivot member (shown in FIGS. 6 and 7 with the key removed for clarity). Key 54 may be tightly fixed within either the platform keyway or the pivot member keyway (or both). Alternatively, key 54 may be tightly fixed to one of the platform keyway or the pivot member keyway, and only slidably fit within the other. For example, key 54 may be tightly fixed within a spherical pivot member keyway 58, and slidably fit within corresponding and complimentary keyway 58 on platform 50, thereby allowing the spherical pivot member to rotate not only about vertical axis of rotation 52, but to also rotate about a horizontal axis of rotation 53, giving the pivot member, and the cooling tube, two degrees of rotational freedom. FIGS. 8 and 9 illustrate movement about these two degrees of freedom, i.e. a horizontal swing or yaw in FIG. 8, and a vertical pitch in FIG. 9. Since the space between the muffle door and the muffle is generally very narrow, however, rotation about a horizontal axis of rotation, that is pitch, is generally limited. It should be readily apparent that eliminating the key and relying on a clamping force, described farther below, pivot member 46 can be moved in a variety of direction, and not limited to simply pitch and yaw.

Integrating pivot member 46 and cooling tube 40 into a single unit that is not permanently coupled to platform 50 facilitates easy replacement of the pivot member and cooling tube combination. For example, a broken cooling tube can be easily replaced by removing the broken pivot member-cooling tube combination, and simply inserting a new pivot member-cooling tube unit. The key-keyway connection between the platform and the new pivot member-cooling tube, if used, allows the new pivot member and cooling tube to be deployed in the precise angular orientation as the original pivot member. Thus, the pivot member-cooling tube unit can be removed without disturbing the position of platform 50 and key 54, and a new pivot member-cooling tube unit reinstalled into the same horizontal angular position as the broken unit.

In the case that only rotation about a vertical axis of rotation is desired (yaw), pivot member 46 may be cylindrical, wherein the central longitudinal axis of the cylindrical pivot member coincides with the platform axis of rotation 52 (FIG. 10). In such cases, the mating surfaces of the socket members described in more detail herein below should be cylindrical to be complimentary to the cylindrical pivot member.

Cooling tube 40 extends through pivot member 46 via passage 48 such that a first portion 60 of cooling tube 40 extends from the pivot member in a direction toward the flowing molten glass, and a second portion 62 of the cooling tube extends from pivot member 46 away from the glass ribbon. Cooling tube 40 includes two ends: proximal end 64 disposed farthest from the flow of molten glass and distal end 66 closest to the flow of molten glass. Proximal end 64 is coupled via coupler 68 through a suitable hose or pipe 70 to a source of pressurized gas, such as air (not shown), so the gas can be flowed through the cooling tube in a direction toward the flow of molten glass. The flow of gas is controlled by flow controller 72 (see FIG. 1) to be less than about 0.085 cubic meters/hr., preferably less than about 0.06 cubic meters/hr. The gas flow can be controlled by conventionally known methods, such as by a rotameter or an electronic mass flow controller. Use of an electronic mass flow controller advantageously allows remote control of the gas flow, but either method, or any other method of controlling gas flow in the amount described above can be suitably substituted for metering the flow of gas supplied to the cooling tube. The cooling gas may be cooled if desired, such as by flowing the cooling gas through a heat exchanger supplied with chilled water (not shown).

Figure 11:
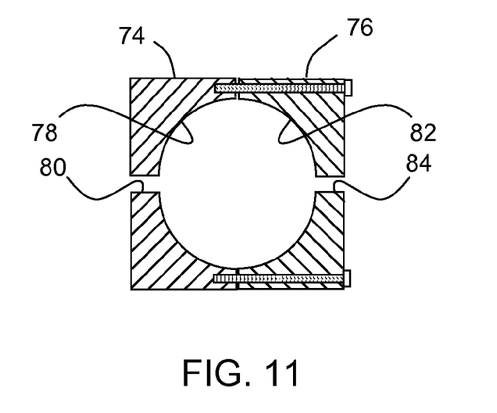
FIG. 11 is a cross sectional side view of the socket members comprising the cooling unit of FIG. 3, showing the central regions that receives the pivot member.
Figure 12:
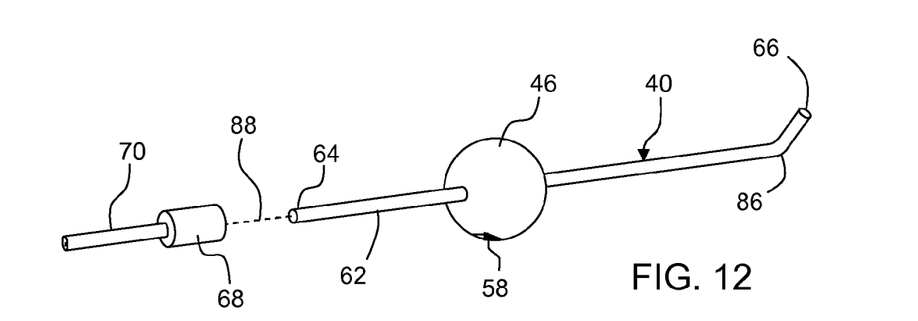
FIG. 12 depicts an exemplary a pivot member-cooling tube unit comprising a bent cooling tube.

Fixture 42 further comprises front or first socket member 74 and rear or second socket member 76, best seen in FIG. 11 and shown without pivot member 46 for clarity. First socket member 74 includes an interior surface 78 where at least a portion of the interior surface is complimentary to a portion of the pivot member. An opening 80 extends through a thickness of the first socket member such that when pivot member 46 is in contact with the complimentary portion of socket interior surface 78, cooling tube 40 extends through opening 80. Opening 80 is sized to allow movement of the pivot member and cooling tube without obstruction over the intended range of movement. That is, opening 80 is sized to allow the pivot member to rotate at least about axis of rotation 52 and therefore cooling tube 40 to swing or yaw within the opening. Preferably, cooling tube 40 is free to swing through an angle of at least about 40 degrees. Similarly, second socket member 76 includes an interior surface 82 where at least a portion of interior surface 82 is complimentary to pivot member 46, and a second opening 84 through which cooling tube 40 extends that allows the second portion of cooling tube 40 to swing when pivot member 46 is rotated.

Rear socket member 76 is coupled to front socket member 74 such that pivot member 46 disposed between the front and rear socket members is held stationary. For example, the front and rear socket members can be coupled one to the other via bolts, screws, clips or other suitable attachment methods so that pivot member 46 is clamped between the socket members. For example, socket members 74 and 76 are shown coupled with bolts in FIG. 11. Pivot member 46 can be first positioned such that cooling tube 40 is directing a cooling gas in the appropriate direction, the clamping elements (e.g. bolts) tightened to lock the pivot member, and the cooling tube, in the desired orientation.

In prior art methods, straight cooling tubes were rigidly mounted in an orientation such that a longitudinal axis of the straight tube was perpendicular to the flow of molten glass adjacent to the end of the tube, and the jet of gas delivered to the molten glass from each cooling tube was restricted to a region directly in front of the cooling tube distal end (and allowing for some natural divergence of the jet). Thus, in a conventional cooling arrangement, the distance between cooling tubes was necessarily small so that the contact area of the gas jet emitted from a cooling tube was directly adjacent to, or even overlapping, the impingement area of an adjacent tube.

The ability of the pivot member according to the present embodiment to rotate about axis of rotation 52 and therefore "swing" cooling tube 40 through a horizontal arc facilitates a reduction in the number of cooling units 38 needed to reach a width of the molten glass compared to conventional methods. For example, cooling tube 40 can be rotated through an angle of at least about 10 degrees, 20 degrees, 30 degrees, or even more than 40 degrees.

In contrast with prior cooling methods, and in accordance with the present embodiment, cooling tubes 40 can be spaced farther apart. If cooling is required in a particular region of the flowing molten glass, owing to a thickness disruption, a cooling tube located closest to the defect can be laterally swung into position by rotating platform 50, and thereby cooling tube 40, so the gas jet emitted by the cooling tube can impinge on the defect region. As a result, fewer cooling units are required, and more importantly, the number of openings in the outer shield is reduced. Reducing the number of openings needed in outer shield members 34 reduces the risk of an uncontrolled draft into (or out of) interior volume 36 surrounded by muffle 24 due to a leak.

Figure 13:
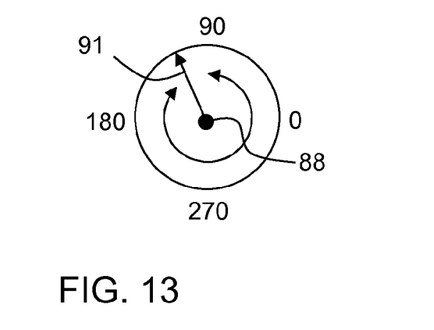
FIG. 13 depicts the angular range of flow emitted by a bent cooling tube.

In some embodiments, cooling tube 40 is straight, having a central longitudinal axis 88 (see FIG. 5). However, in other embodiments each cooling tube comprises an elbow or bend 86 proximate distal end 66. By coupling cooling tube 40 within passage 48 of pivot member 46 such that the cooling tube is not permanently and rigidly bonded to the pivot member, such as using a releasable method of coupling the pivot member and the cooling tube (e.g. a clamping method, or an interference fit), the cooling tube can be rotated about its longitudinal axis 88 (at least the straight portion of the longitudinal axis 88 between the bend and the proximal end). Rotating cooling tube 40 within passage 48 results in the distal end 66 of the cooling tube describing an arc about longitudinal axis 88. By "describe" what is meant is that a point, or series of points, on a body (or flow of material, such as a gas flow) in motion traces a geometric shape in space (or on a surface). If, for example, cooling tube 40 is rotated through 360 degrees, the jet of gas emitted by the cooling tube describes or traces a complete circle on the molten glass where it intersects the surface of the molten glass, as shown in FIG. 13 where the arrow 91 indicates the angular direction of gas flow with respect to a horizontal longitudinal axis 88 of the cooling tube. The radius of the circle depends of course on the degree of bend in the cooling tube and the length of the cooling tube extending past the bend (i.e. the length of the straight section of cooling tube between the bend and the distal end of the cooling tube. Preferably, the length of cooling tube extending beyond the bend toward the flow of molten glass is less than about 5 cm).

Alternatively, a series of pivot member-cooling tube units can be manufactured with the various orientations of the bent cooling tube relative to the keyed position of the pivot member. When a different angular orientation of the cooling tube is desired, an in-place pivot member-cooling tube unit can be replaced with one having the desired orientation.

Figure 14:
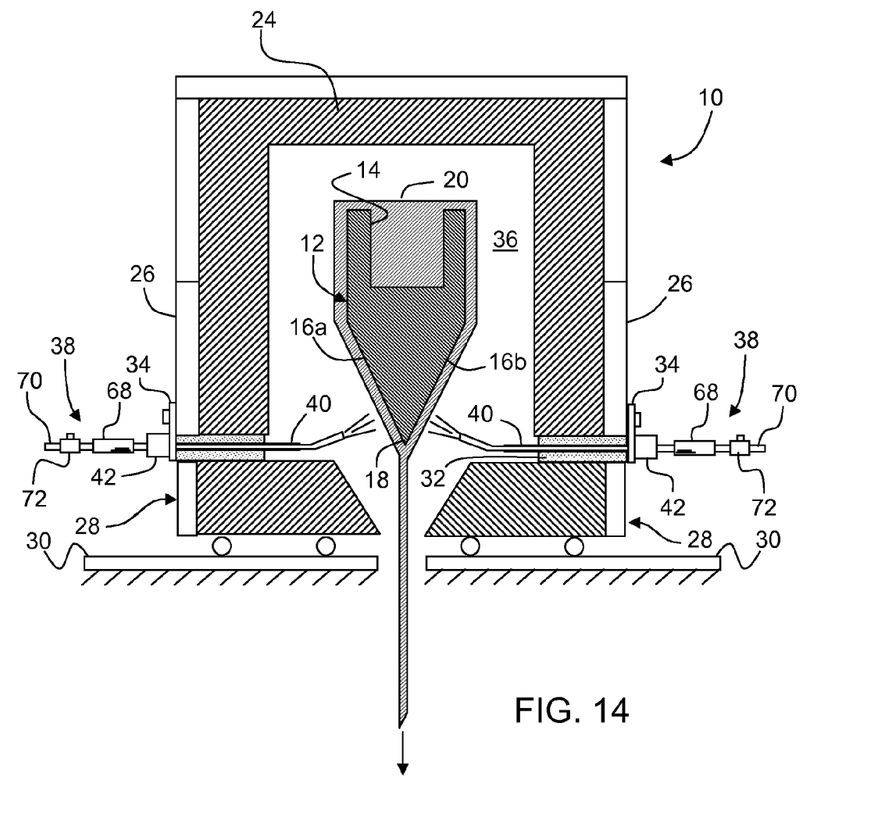
FIG. 14 is a cross sectional view of an exemplary fusion downdraw process utilizing bent cooling tubes.

In still another embodiment, if a keyed pivot member is not used, simply loosening the clamping elements coupling the first and second socket members can allow the entire pivot member to rotate, thereby rotating the orientation of the distal end of the bent cooling tube. An apparatus 10 utilizing bent cooling tubes is depicted in FIG. 14.

It has been found that the orientation of the gas flow can be used to either increase or decrease the thickness of the molten glass at the point where the gas stream impinges on the flow of molten glass. That is, if the gas flow is moving in a direction counter to the flow of molten glass (i.e. a vector representing the flow of gas comprises a vector opposed to the flow vector of the molten glass), the effect on the thickness of the flow is different than if the flow vector of the gas comprises a vector that is in the same direction as the flow vector of the molten glass. Put more simply, the effect on the thickness of the molten glass when the gas flow is generally upstream (against the flow of the glass) is different than if the gas stream is moving generally downstream, with the glass. The former situation occurs when the distal end of a bent cooling tube is pointed in a generally 90 degree direction (using FIG. 13 for reference). The latter situation occurs when the distal end of a bent cooling tube is pointed in a generally 270 degree orientation. These different effects are graphically illustrated in FIG. 15, where thickness changes in the flow of molten glass (e.g. the ribbon thickness at the root) are modeled for four different orientations: when the distal end of the bent cooling tube is directed to the zero degree orientation, the 90 degree orientation, the 180 degree orientation, the 270 degree orientation and the zero degree orientation. The distal end of the tube was assumed to be maintained approximately 4 inches away from the surface of the flowing molten glass.

Figure 15:
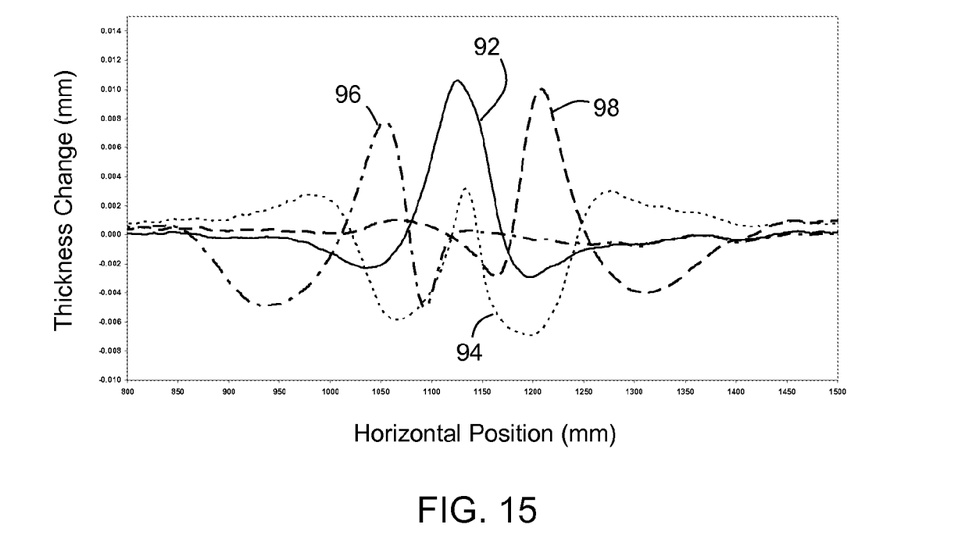
FIG. 15 is a graphical comparison of the modeled thickness associated with a single bent cooling tube on a continuously flowing ribbon of molten glass at various angular positions of the bent tip or distal end of the cooling tube.

In the 90 degree orientation (curve 92) the gas stream impinges at is highest vertical location on the flow of molten glass in these experiments). The thickness change is plotted on the vertical axis, in microns, while the horizontal position relative to the ribbon width is shown on the horizontal axis. The characteristic width of curve 92 (the distance between the innermost zero crossings on the horizontal axis) is nominally about 9.7 cm. The surrounding outer regions extend roughly four times as far as the inner region and correspond to a negative thickness change (thinning of the molten glass) consistent with the conservation of mass.

In the 270 degree orientation (curve 94) the air stream impinges at its lowest vertical location and imparts a markedly different thickness change. This signature can be viewed as either a thickening or a thinning effect. Viewed as a thickening effect, the characteristic width is nominally approximately 2.8 cm but with an exceptionally wide surrounding outer area consisting of regions of both negative and positive thickness change (thinning and thickening, respectively). Viewed as primarily a thinning effect, the characteristic width is nominally approximately 22.4 cm with an outer region of positive thickness change that extends to roughly three times as far as the inner region but with an exceptionally narrow inner region of positive thickness change.

The 0 and 180 degree cases (curves 96 and 98, respectively) illustrate how the impingement location is changed when the tube angle points more strongly to either edge of the ribbon. The peaks are approximately 15.2 cm apart—close to what is calculated from simple trigonometry. They also show that the degree of thickness change is highest on the side of the impingement location closest to the tube exit. Angles intermediate between the four illustrated here are certainly possible too; their thickness impact would also be intermediate between their nearest neighbor angles. These same effects could also be achieved with straight tubes if adequate orientation flexibility were available, such as having two or more degrees of freedom of movement.

In embodiments where the cooling tube is not rigidly secured to the pivot member, such as when the cooling tube is coupled to the pivot member by a compression fitting or clamping mechanism, each cooling tube may be translated within its respective pivot member. That is, the cooling tube can be loosened from the pivot member (by loosing the compression fitting or clamp) and moved closer to or farther from the molten glass by sliding the cooling tube within passage 48. Translation of cooling tube 40 relative to pivot member 46 can be combined with pitch and yaw of cooling tube 40, or rotation relative to pivot member 46.

Figure 16:
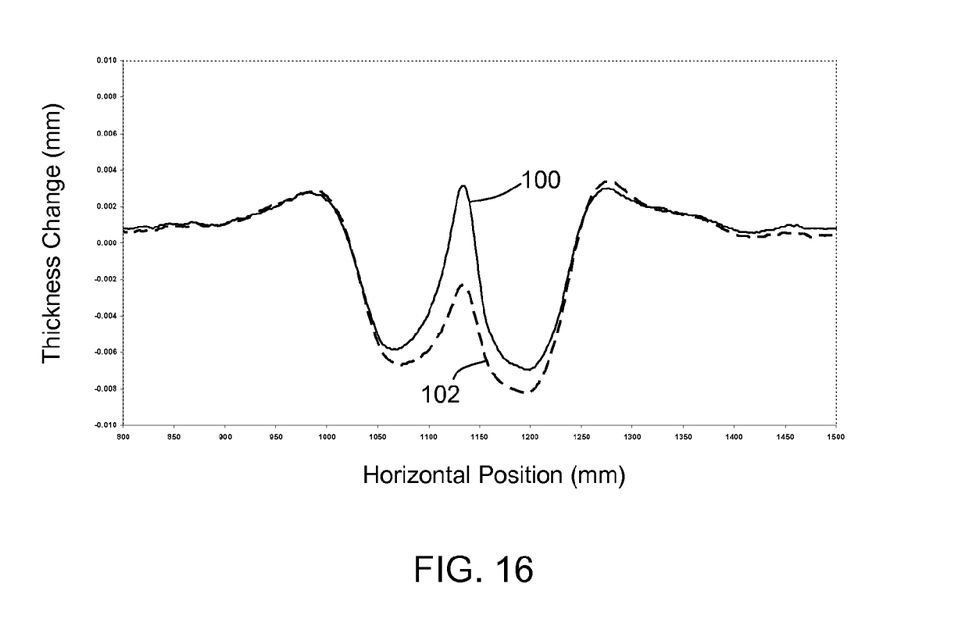
FIG. 16 graphically illustrates the difference between two cases where the impingement angle is kept constant (270 degrees) while the distal end to glass distance is increased by translating the tube away from the glass ribbon).

The effect of distance from the distal end of the tube to the impingement point can also change the resultant thickness response. FIG. 16 graphically illustrates the difference between two cases where the impingement angle is kept constant while the distal end to glass distance is increased by translating the tube away from the glass ribbon). Here the tube in its 270 degree configuration was pulled back from approximately 10.2 cm (curve 100) to approximately 14.0 cm (curve 102) away from the plane of the ribbon. Simple trigonometry predicts that the impingement distance increased from approximately 11.7 cm to approximately 16.3 cm. As the tube is pulled back from the ribbon the central peak becomes much smaller, and on the whole the thickness effect more closely resembles a pure thinning effect.

Figure 17:
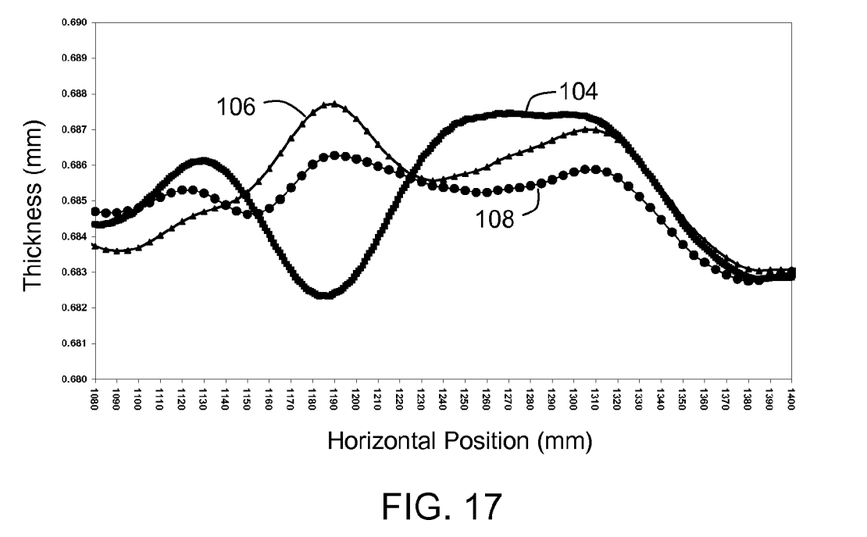
FIG. 17 depicts a graphical comparison between the modeled thickness control afforded by a straight, rigidly mounted cooling tube and a bent cooling tube that includes a distal end that can be angled into different orientations based on originally measured thickness data.
Figure 18:
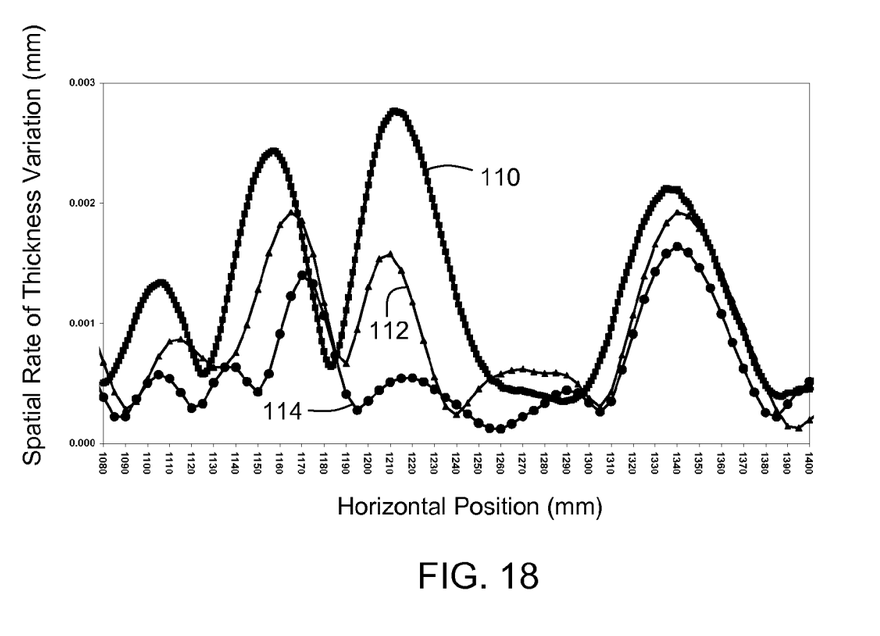
FIG. 18 is a plot of the range of thickness variation over a moving 25 mm window for the data of FIG. 17.
Figure 19:
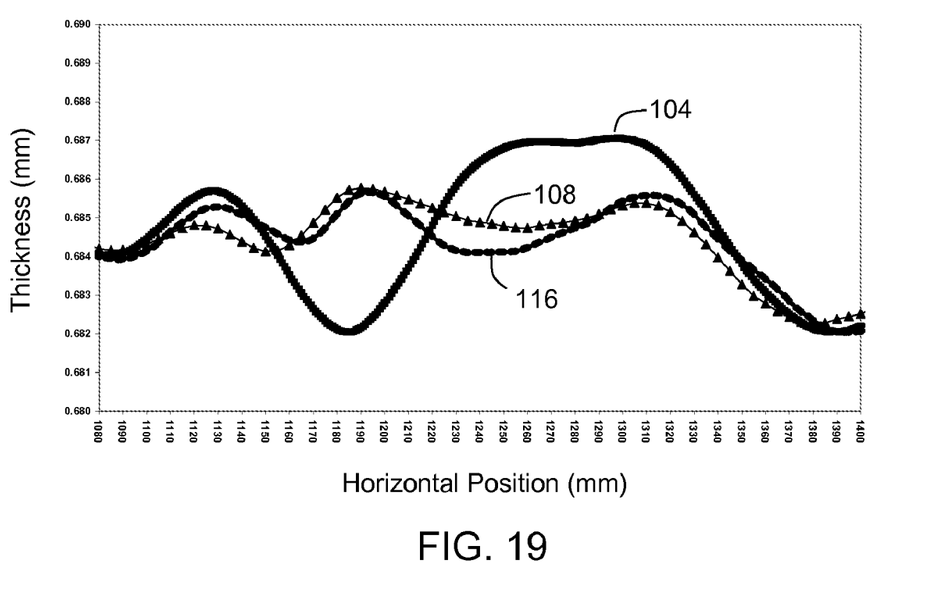
FIG. 19 is a plot comparing modeled thickness data for a bent tube orientation to actual thickness data for the ribbon of FIG. 17.

By exploiting the additional capability offered by allowing for variable impingement angle and variable distance from the tube exit to the impingement point (impingement distance) several significant advantages can be realized, for example when naturally occurring thickness deviations are not symmetric and in situations where a thinning effect is more appropriate than a thickening effect as the compensatory action. FIGS. 17a, 17b, and 18 illustrate how adjusting the impingement angle results in a more effective thickness correction compared with a purely perpendicular impingement angle. In FIG. 17a, curve 104 represents the measured thickness of a continuous glass ribbon across a portion of its width at the root of an operating fusion draw. Curve 106 represents the modeled effect of a thickness correction applied by aiming a cooling gas stream emitted by a straight cooling tube 40 at a point approximately 118.4 cm from an edge of the moving ribbon of glass in a purely perpendicular arrangement. That is, where the central longitudinal axis of the cooling tube is perpendicular to a vertical plane passing through the root of the forming body. Curve 108 represents the modeled effect of a thickness correction applied by aiming a bent tube at this same location at an orientation of 180 degrees (refer to FIG. 13). FIG. 18 shows the range of thickness variation over a 25 mm interval centered on each point of the thickness data of FIG. 17. That is, curve 110 indicates the range of thickness over a 25 mm interval that is centered on each point of thickness measurement for the measured data of curve 104. For example, for a thickness data point of curve 104 in FIG. 17, thickness data both 12.5 mm to the right of a base data point of FIG. 17 and 12.5 to the left of the base data point of curve 104 is analyzed, and the absolute value of the largest difference between the data within that window is plotted as curve 110 in FIG. 18. Similarly, curve 112 represents the range of the thickness measurement over a moving 25 mm interval centered on each point of thickness measurement for curve 106 and curve 114 is the range of the thickness measurement over a moving 25 mm interval centered on each point of thickness measurement for curve 108. Minimizing this local thickness variation value over the entire width of the glass ribbon is a key objective in thickness correction. As the curves indicate, the minimum and maximum value of this range data is obtained by varying the orientation of a bent tube. In particular, FIG. 18 shows the maximum range values in the vicinity of the 118.4 cm location have been reduced from ~0.0028 mm (base case) to ~0.0019 mm (straight tube) to ~0.0014 mm (bent tube). Additionally the maximum variation values in the vicinity of the 133.8 cm location have been reduced from ~0.0021 mm (base case) to ~0.0019 mm (straight tube) to ~0.0016 mm (bent tube). FIG. 19 compares actual measured thickness results (curve 116) obtained by using the bent tube orientation in a 180 degree orientation compared with the modeled results (curve 108 from FIG. 17), and shows good agreement between the modeled results and the actual results.

The ability to modify either or both of the angular orientation of the cooling tube distal end and its distance from the flowing molten glass can also increase the usable width of the ribbon (the width of the quality area) by thickening region of the glass sheet that are too narrow and/or too asymmetric to address with conventional methods.

Thickness control capability can be extended even further by employing multiple tube combinations aimed at the same impingement location (or same x coordinate, but different z coordinate).

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. An apparatus for forming a continuous ribbon of molten glass in a downdraw glass making process comprising:
    a forming body comprising converging forming surfaces that converge at a root;
    an enclosure disposed about the forming body;
    a cooling apparatus coupled to the enclosure comprising;
        a fixture;
        a pivot member disposed within the fixture, the pivot member configured to rotate about at least one axis passing through the pivot member; and
        a cooling tube coupled to the pivot member and configured to direct a cooling gas flow toward molten glass flowing over the forming body such that the cooling gas flow impinges on the molten glass, wherein rotation of the pivot member about the at least one axis causes a lateral position of an end of the cooling tube to vary relative to the forming body.

2. The apparatus according to claim 1, wherein the pivot member is substantially spherical.

3. The apparatus according to claim 1, wherein the pivot member is cylindrical.

4. The apparatus according to claim 1, wherein the at least one axis is a vertical axis.

5. The apparatus according to claim 1, wherein the cooling tube comprises a refractory material.

6. The apparatus according to claim 1, wherein the fixture comprises a mating surface complementary to a mating surface of the pivot member, the fixture configured to receive the pivot member and prevent gas flow between the pivot member and the fixture.

7. The apparatus according to claim 1, wherein the cooling tube comprises a proximal end and a distal end, the distal end being closer to the ribbon of molten glass than the proximal end, and wherein the cooling tube further comprises a bend proximate the distal end.

8. The apparatus according to claim 1, wherein the apparatus comprises a plurality of cooling tubes arrayed adjacent at least a portion of a length of the forming body.

9. The apparatus according to claim 1, wherein the cooling tube comprises a proximal end and a distal end, the distal end being closer to the ribbon of molten glass than the proximal end, and wherein the cooling tube comprises a central longitudinal axis extending between the proximal end and the distal end, the longitudinal axis being straight between the proximal and distal ends.

10. A method of controlling a thickness of a continuous ribbon of molten glass in a fusion downdraw process comprising:
    flowing molten glass over converging forming surfaces of a forming body, the converging forming surfaces meeting at a root;
    directing a cooling gas flow to impinge against the molten glass proximate the root from at least one cooling tube coupled to a pivot member configured to rotate about at least one axis of rotation; and
    wherein at least a portion of a central longitudinal axis of the at least one cooling tube is not perpendicular to a vertical plane passing through the root.

11. The method according to claim 10, wherein the cooling tube comprises a proximal end and a distal end, wherein the distal end is closer to the flow of molten glass than the proximal end, and the cooling tube comprises a bend proximate the distal end.

12. The method according to claim 10, wherein the directing step comprises directing a cooling gas flow from a plurality of cooling tubes.

13. The method according to claim 10, wherein the cooling gas flow impinges on the molten glass above the root.

14. The method according to claim 10, wherein the flow of cooling gas is directed downstream relative to a direction of flow of the molten glass.

15. The method according to claim 10, wherein a portion of the longitudinal axis of the at least one cooling tube is perpendicular to a vertical plane within which the root lies.

16. The method according to claim 10, further comprising rotating the pivot member about the axis of rotation.

17. The method according to claim 10, wherein the pivot member is configured to rotate about two orthogonal axis of rotation.

18. A method of controlling a thickness of a continuous ribbon of molten glass in a fusion downdraw process comprising:
    flowing molten glass over converging forming surfaces of a forming body, the converging forming surfaces meeting at a root;
    directing a cooling gas flow against the molten glass proximate the root from at least one cooling tube coupled to a pivot member configured to rotate about at least a vertical axis of rotation and a horizontal axis of rotation; and
    wherein at least a portion of a central longitudinal axis of the at least one cooling tube is not perpendicular to a vertical plane passing through the root.

19. The method according to claim 18, wherein the cooling gas flow is directed below the root.

* * * * *